US 8,249,600 B2

(12) United States Patent
Hamada (10) Patent No.: US 8,249,600 B2
(45) Date of Patent: Aug. 21, 2012

(54) MOBILE STATION CAPABLE OF SWITCHING CONNECTION DESTINATION RADIO BASE STATION AND METHOD OF SWITCHING CONNECTION DESTINATION

(75) Inventor: Hakudo Hamada, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 465 days.

(21) Appl. No.: 12/427,492

(22) Filed: Apr. 21, 2009

(65) Prior Publication Data
US 2009/0275336 A1  Nov. 5, 2009

(30) Foreign Application Priority Data

Apr. 30, 2008 (JP) ................................. 2008-118433

(51) Int. Cl.
 *H04W 36/00* (2009.01)

(52) U.S. Cl. ........ 455/437; 455/436; 370/311; 370/331; 370/332; 370/333

(58) Field of Classification Search .................. 455/37, 455/436, 437; 370/32, 311, 332
See application file for complete search history.

(56) References Cited

U.S. PATENT DOCUMENTS 5,428,816 A * 6/1995 Barnett et al. ................. 455/437
5,799,256 A * 8/1998 Pombo et al. ................. 455/574

FOREIGN PATENT DOCUMENTS

| JP | 08-154269 A | 6/1996 |
| JP | 2001-95028 A | 4/2001 |
| JP | 2003-348007 A | 12/2003 |
| JP | 2004-207922 A | 7/2004 |
| JP | 2004-260690 A | 9/2004 |
| JP | 2005-94806 A | 4/2005 |
| JP | 2005-109823 A | 4/2005 |
| JP | 2007-116696 A | 5/2007 |
| JP | 2008-035471 A | 2/2008 |
| WO | WO 2007/007593 A1 | 1/2007 |

* cited by examiner

*Primary Examiner* — Amancio Gonzalez
(74) *Attorney, Agent, or Firm* — Sughrue Mion, PLLC (57) ABSTRACT

A quality memory unit remembers a quality table in which qualities of communication with radio base stations are arranged according to identification information of the radio base stations. A processing unit determines, based on the quality table in the quality memory unit, a selecting radio base station to select a switching radio base station to be a connection destination after switching. The processing unit sends the quality table to the selecting radio base station when switching the connection destination radio base stations. A mobile station communication unit receives identification information specifying the switching radio base station selected based on the quality table sent from the processing unit and sends a connection request to the switching radio base station specified by the identification information.

8 Claims, 5 Drawing Sheets

MOBILE STATION CAPABLE OF SWITCHING CONNECTION DESTINATION RADIO BASE STATION AND METHOD OF SWITCHING CONNECTION DESTINATION

This application is based upon and claims the benefit of priority from Japanese Patent Application No. 2008-118433 filed on Apr. 30, 2008, the content of which is incorporated by reference.

BACKGROUND OF THE INVENTION

1. Field of the Invention

The present invention relates to a mobile station and a method of switching connection destinations.

2. Description of the Related Art

Figure 1:
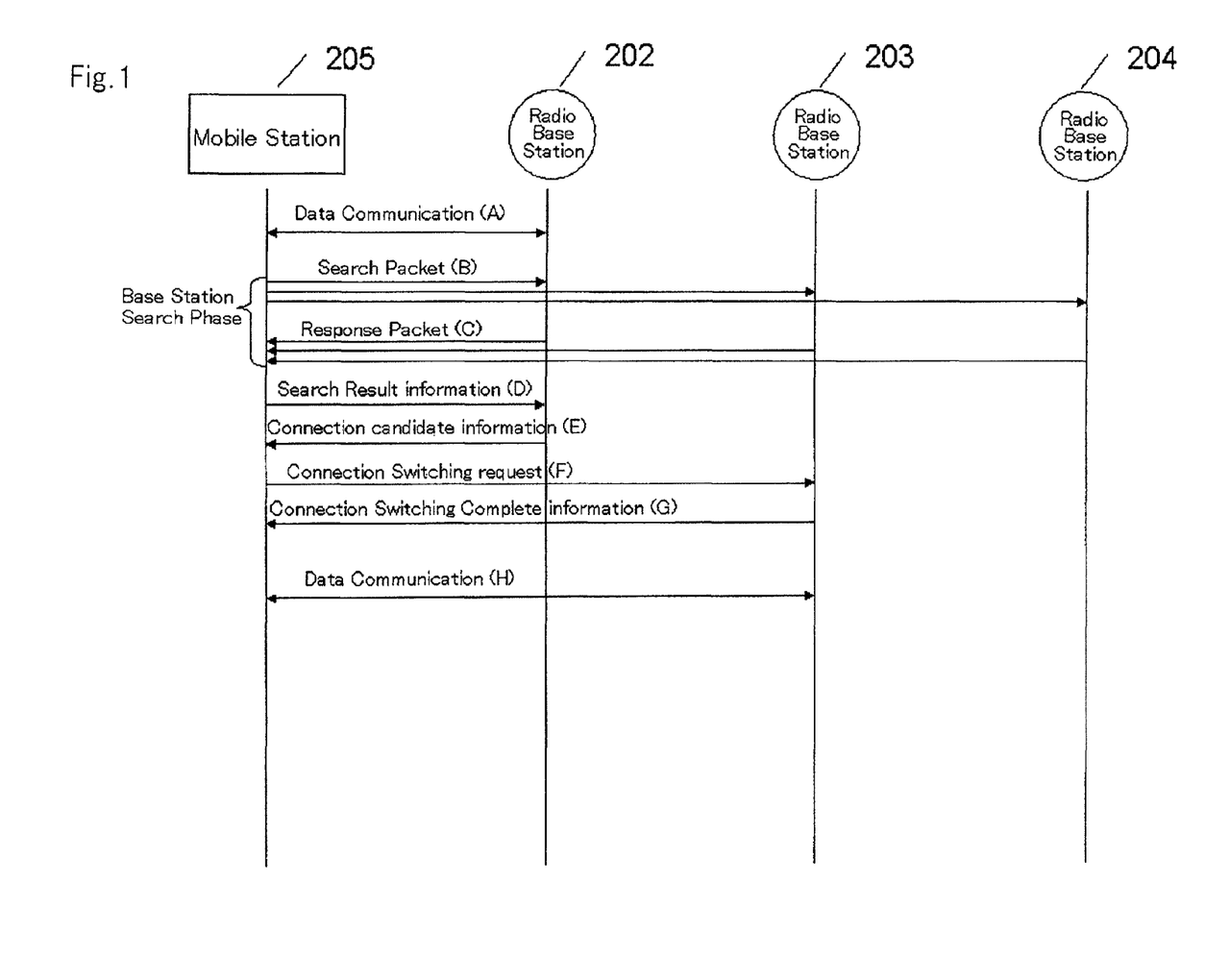
FIG. 1 is a sequence diagram illustrating an operation of a mobile communication system performing handover.

In a mobile communication system, a mobile station generally performs an operation of switching connection destination radio base stations when the quality of radio communication with a current radio base station gets worse. The operation of switching the connection destination radio base station is referred to as handover. FIG. 1 is a sequence diagram illustrating an operation of a mobile communication system performing handover.

Mobile station 205 is performing data communication with radio base station 202. Here, mobile station 205 measures the quality of radio communication with radio base station 202 based on a signal received from mobile station 202. Examples of the quality of radio communication include the reception level of the received signal, the ratio of the reception level to the noise level (hereinafter, referred to as Signal to Noise (SN) ratio), etc. Examples of the signal for measuring the quality of radio communication include a piece of notification information, a data frame, an acknowledgment packet in response to a data frame sent from mobile station 205, etc.

Mobile station 205 starts handover when the quality of radio communication is below a predetermined threshold (step A).

Mobile station 205 sends a search packet for searching other neighboring radio base stations using radio broadcast communication (step B). Then, mobile station 205 receives a search response packet from one or more of the neighboring radio base stations (step C).

Mobile station 205 determines, based on the search response packet, the quality of radio communication with the radio base station, which sent the search response packet, and remembers a table in which the qualities of radio communication are arranged according to radio base stations. Mobile station 205 selects a radio base station having the best quality of radio communication by comparing the qualities of radio communication in the table. Then, mobile station 205 switches a connection destination to the selected radio base station by notifying a connection switching request to the selected radio base station.

In this case, the radio base station acting as the connection destination is determined based on the qualities of radio communication compared by mobile station 205. However, in real-time communication processing of voices and dynamic images, when the connection destination is switched based on only the qualities of radio communication compared by mobile station 205, communication with the switched radio base station is sometimes not continued. For example, when the available bandwidth of the switched radio base station is subjected to excessive traffic load due to congestion, communication is sometimes not continued. Therefore, the following process is performed.

When the search response packet is received (step C), mobile station 205 notifies currently-communicating radio base station 202 of the table, in which the qualities of radio communication are arranged according to the radio base stations, as search result information (step D). Radio base station 202 checks the state of available bandwidths of the radio base stations included in the search result information, and notifies mobile station 205 of a radio base station having the best available bandwidth as connection candidate information (step E).

Mobile station 205 notifies a connection switching request to the mobile station corresponding to the notified connection candidate information (hereinafter, referred to as radio base station 203) (step F). When the connection switching request is received, radio base station 203 notifies mobile station 205 that connection switching is completed, thereby completing the handover.

Technologies capable of performing such handover include for example a mobile station disclosed in Document 1 (Japanese Laid-Open Patent Application 2001-95028).

According to the technology capable of performing handover, mobile station 205 sends search result information to currently-communicating radio base station 202 and receives connection candidate information from radio base station 202.

In this case, search result information is sent only when the quality of radio communication is below a predetermined threshold. Thereby, mobile station 205 sends the search result information to a radio base station having a low quality of radio communication, and communication may be disconnected while connection candidate information is being received after sending the search result information. For example, when mobile station 205 is blocked by a metal door, etc., the quality of radio communication may get worse by opening/closing the door, thereby causing to be disconnected disconnect communication before finishing.

Accordingly, the foregoing technology capable of performing handover has a problem in that attempts to switch radio base stations frequently fail.

SUMMARY OF THE INVENTION

One object of the invention is to provide a mobile station and a method of switching connection destinations, which can solve the foregoing problems in which attempts to switch radio base stations frequently fail.

The mobile station of the invention can connect to a plurality of radio base stations. The mobile station may include quality memory means for remembering a quality table in which different quality levels of communication with the radio base stations are arranged according to identification information of the radio base stations; processing means determining, based on the quality table in the quality memory means, for a selecting radio base station to select a switching radio base station to be a connection destination after switching and sending the quality table to the selecting radio base station when switching connection destination radio base stations; and connecting means, if identification information of the switching radio base station selected by the selecting radio base station according to the quality table sent from the processing means is received, for sending a connection request to the switching radio base station specified by the identification information.

In addition, the method of switching connection destinations of the invention can be carried out by a mobile station, which is capable of connecting to a plurality of radio base stations and includes quality memory means for remembering a quality table in which different quality levels of communication with the radio base stations are arranged according to identification information of the radio base stations. The method may include determining, based on the quality table in the quality memory means, a selecting radio base station to select a switching radio base station to be a connection destination after switching and sending the quality table to the selecting radio base station when switching connection destination radio base stations; and if identification information of the switching radio base station selected by the selecting radio base station according to the quality table sent from the processing means is received, sending a connection request to the switching radio base station specified by the identification information.

The above and other objects, features, and advantages of the present invention will become apparent from the following description with reference to the accompanying drawings which illustrate examples of the present invention.

DETAILED DESCRIPTION OF THE EXEMPLARY EMBODIMENTS

Exemplary embodiments of the present invention will now be described more fully with reference to the accompanying drawings.

Figure 2:
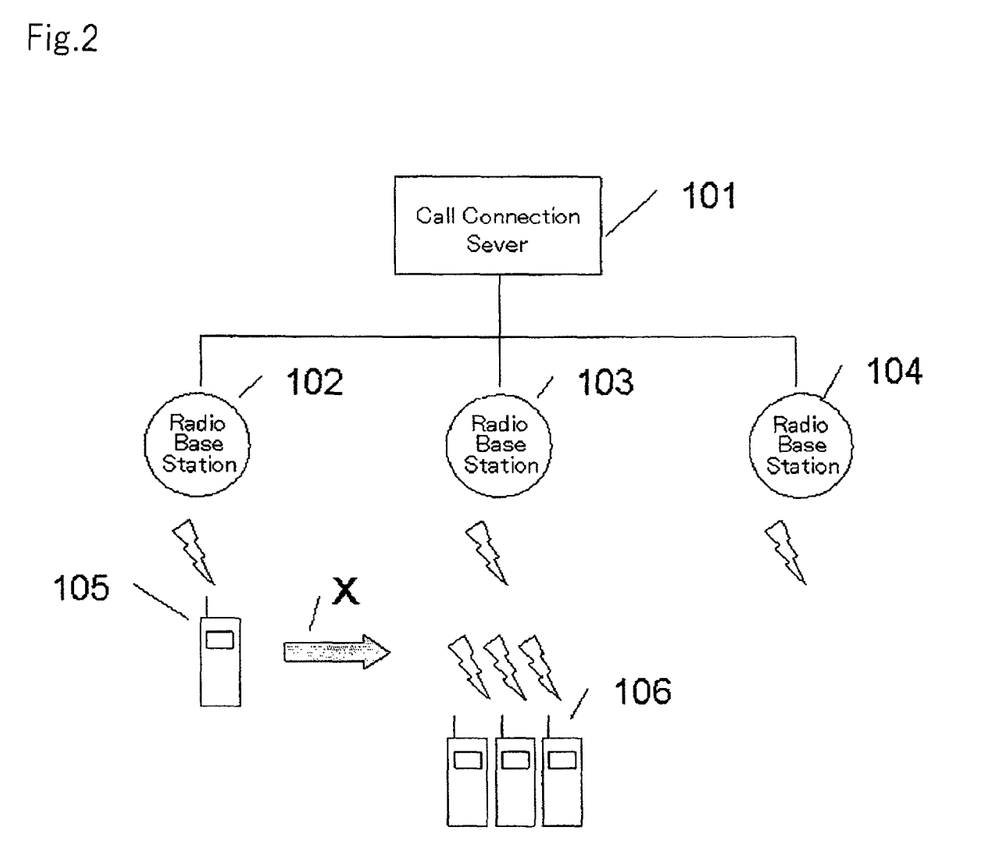
FIG. 2 is a block diagram illustrating a multimedia mobile communication system according to a first embodiment of the invention.

FIG. 2 is a block diagram illustrating a multimedia mobile communication system according to a first exemplary embodiment of the invention. Referring to FIG. 2, the multimedia mobile communication system includes call connection server 101, radio base stations 102 to 104 and mobile station 105. While the number of radio base stations is only three (3) in FIG. 2, a plurality of radio base stations can be provided in practice.

Call connection server 101 has radio base stations 102 to 104 hereunder. Call connection server 101 can connect to each of radio base station 102 on a wired Local Area Network (LAN). Mobile station 105 can connect to each of radio base stations 102 to 104. In addition, mobile station 105 can connect to call connection server 101 using Internet Protocol (IP) through one of radio base stations 102 to 104.

In this exemplary embodiment, communication between call connection server 101 and mobile station 105 is regarded as voice communication. However, the communication is not limited to voice communication but can also be applied to general data communication. Preferably, the communication can be applied to multimedia communication including voice communication, dynamic image communication and regular data communication, in which real-time process is required.

Call connection server 101 remembers a state table in which the amount of using available bandwidths that is used for communication between radio base stations and mobile station 105 is arranged according to pieces of identification information specifying the radio base stations. Here, the amount of available bandwidths that is used indicates the number of mobile stations connected to a radio base station or the total of traffics of the mobile stations connected to the radio base station.

Figure 3:
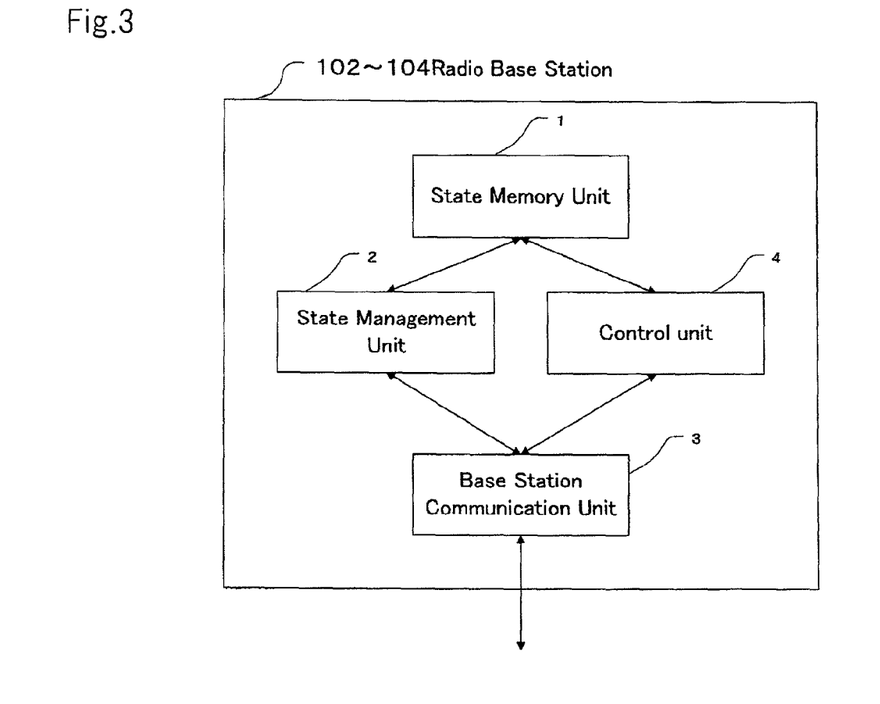
FIG. 3 is a block diagram illustrating a configuration of a radio base station.

FIG. 3 is a block diagram illustrating a configuration of radio base stations 102 to 104. In this case, it shall be assumed that all radio base stations 102 to 104 have the same configuration.

Referring to FIG. 3, each of radio base stations 102 to 104 includes state memory unit 1, state management unit 2, base station communication unit 3 and control unit 4.

State memory unit 1 remembers identification information specifying its own base station as its own identifying information.

State management unit 2 periodically acquires the state table from call connection server 101 and remembers the state table in state memory unit 1. State management unit 2 also measures the amount of available bandwidth that is used and remembers the measured amount as the amount of its own that is used in state memory unit 1. In addition, state management unit 2 periodically updates the state table in call connection server 101 by notifying call connection serve 101 of the amount of its own bandwidth that it uses in state memory unit 1 and identification information.

Base station communication unit 3 performs voice communication with mobile station 105.

In addition, base station communication unit 3 receives a search packet for searching a base station, a connection switching request for the purpose of switching connection destination radio base stations, and search result information indicating a search result based on a search packet. The connection switching request is an example of a connection request.

In the search result information, different quality levels of radio communication between mobile station 105 and radio base stations are arranged according to the identification information. The different quality levels of radio communication includes signal levels, which are levels of signals which mobile station 105 received from the base stations, and ratios of the signal levels with respect to noise levels (SN ratios), etc.

When base station communication unit 3 receives a search packet, control unit 4 notifies a response packet in response to the search packet to mobile station 105. The response packet includes identifying information of its own base station inside state memory unit 1.

In addition, when base station communication unit 3 receives a pair including a connection switching request and the search result information, control unit 4 determines whether or not to reject the connection switching request. For example, control unit 4 determines whether or not the amount of its own bandwidth that it use inside the state memory unit 1 is at least a predetermined reference value, rejects the connection switching request if the amount of its own bandwidth that it uses is at least the predetermined reference value, and approves the connection switching request if the amount of its own bandwidth that it uses is below the predetermined reference value.

If control unit 4 rejects the connection switching request, base station communication unit 3 selects a switching radio base station to be a connection destination candidate after switching.

For example, firstly, the control unit searches for the amount of bandwidth that it uses e below a predetermined value from amounts of using available bandwidth that is used in the state table, and checks identification information corresponding to the amount of use below a predetermined value. Then, control unit 4 extracts the different quality levels of radio communication corresponding to the checked identification information from the search result information. In addition, control unit 4 selects, as the switching radio base station, a radio base station specified by the identification information that corresponds to best quality level of radio communication from amongst the extracted different levels.

When the switching radio base station is selected, control unit 4 sends identification information specifying the switching base station and the rejection code that notifies rejection of the connection switching request to mobile station 105. The rejection code is an example of rejection information.

In addition, if the connection switching request is approved and if base station communication unit 3 receives only the connection switching request, control unit 4 sends connection switching complete information as a response to the connection switching request to mobile station 105. The connection switching complete information is an example of approval information that notifies approval of the connection switching request.

Figure 4:
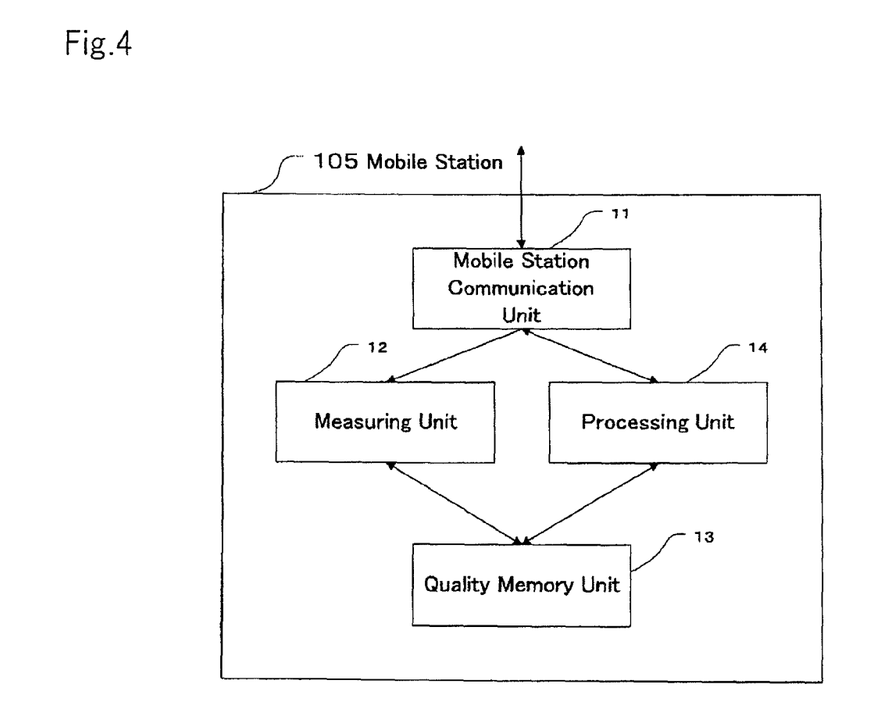
FIG. 4 is a block diagram illustrating a configuration of a mobile station.

FIG. 4 is a block diagram illustrating a configuration of a mobile station. Referring to FIG. 4, mobile station 105 includes mobile station communication unit 11, measuring unit 12, quality memory unit 13 and processing unit 14.

Mobile station communication unit 11 is an example of connecting means. Mobile station communication unit 11 performs voice communication with one of radio base stations 102 to 104. In addition, mobile station communication unit 11 receives a voice packet, a rejection code, connection candidate information and connection switching complete information from radio base stations 102 to 104.

In addition, when connection switching complete information is received from a radio base station, mobile station communication unit 11 connects to the radio base station, which sent the connection switching complete information.

Measuring unit 12 measures the quality of radio communication with the connected radio base station based on a signal received when mobile station communication unit 11 is performing voice communication. Measuring unit 12 determines whether or not the measured quality of radio communication is at least at a predetermined threshold.

In addition, when mobile station communication unit 11 receives a response packet, measuring unit 12 measures the quality of radio communication with the radio base station, which sent the response packet, based on the response packet.

Quality memory unit 13 remembers a quality table in which the different quality levels of radio communication, which measuring unit 12 measured based on response packets, are arranged according to identification information in the response packets. Thereby, in the quality table, the different quality levels of radio communication with respective radio base station are arranged according to respective pieces of identification information.

Processing unit 14 starts switching connection destination radio base stations (handover) if measuring unit 12 determines that the quality of radio communication is below the predetermined threshold.

In detail, firstly, processing unit 14 sends a search packet to other neighboring radio base stations using radio broadcasting communication. At a predetermined time after sending the search packet, processing unit 14 determines, based on the quality table in quality memory unit 13, a selecting radio base station that will select a switching radio base station. For example, processing unit 14 determines a radio base station specified by an identifier corresponding to the best quality of radio communication in the quality table as the selecting radio base station.

Then, processing unit 14 sends the pair including a connection switching request and the quality table to the selecting radio base station. Here, processing unit 14 sends the quality table as search result information.

In addition, when mobile station communication unit 11 receives a rejection code and connection candidate information, processing unit 14 sends the connection switching request through mobile station communication unit 11 to the switching radio base station specified by identification information, i.e., connection candidate information. Thereby, when the rejection code and the connection candidate information are received, mobile station communication unit 11 sends the connection switching request.

Below, a description will be given of an operation.

Figure 5:
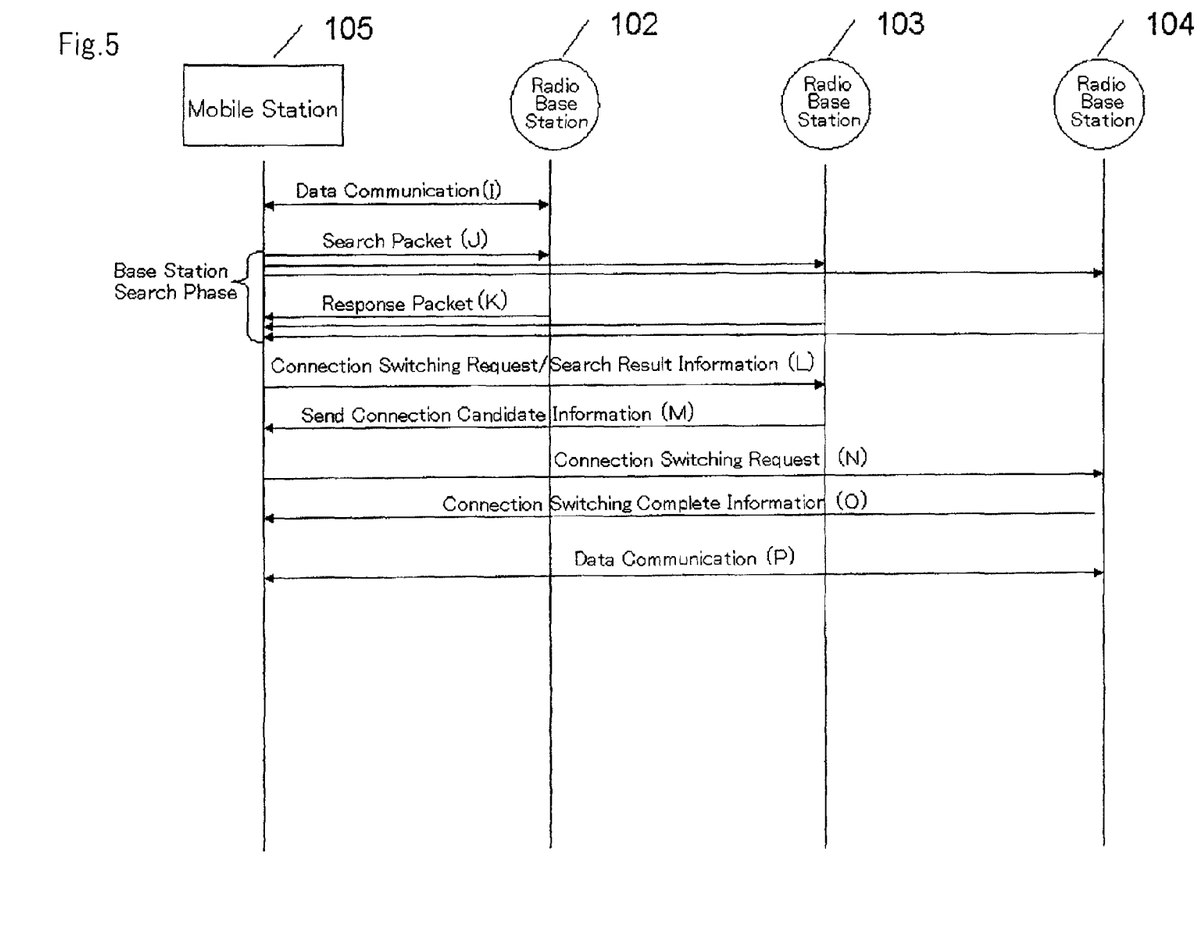
FIG. 5 is a sequence diagram illustrating an operation of a multimedia mobile communication system.

FIG. 5 is a sequence diagram illustrating an operation of a multimedia mobile communication system. In more detail, FIG. 5 is a sequence diagram for explaining the operation of the multimedia mobile communication system, which is carried out in handover.

Here, it shall be assumed that Mobile station 105 is communicating with radio base station 102. It shall also be assumed that radio base station 103 is communicating with a plurality of radio mobile stations 106 and radio base station 104 is not communication with any radio mobile stations. Thereby, a great amount of available bandwidths is used in radio base station 103, and a small amount of available bandwidth is used in radio base station 104.

Firstly, measuring unit 12 of mobile station 105 periodically measures the quality of radio communication in voice communication, which is performed by mobile station communication unit 11. Measuring unit 12 determines whether or not the quality of radio communication is at least at a predetermined threshold (step I).

It shall be assumed that mobile station 105 is moving at present in the direction of arrow X in FIG. 2 while communicating with radio base station 102. Since mobile station 105 is moving away from radio base station 102, the quality of radio communication of mobile station 105 with radio base station 102 gets worse.

When the quality of radio communication is below the predetermined threshold, measuring unit 12 sends a signal notifying that the quality of radio communication is below the threshold to processing unit 14. When the signal is received, processing unit 14 generates a search packet and sends the search packet to a radio network using broadcast communication through mobile station communication unit 11 (step J).

When the search packet is received, respective base station communication unit 3 of radio base stations 102 to 104 sends the search packet to control unit 4. Control unit 4, upon receiving the search packet, acquires its own identification information from state memory unit 1, and generates a response packet including its own identification information. Control unit 4 sends the generated response packet to mobile station communication unit 11 of mobile station 105 through base station communication unit 3 (step K).

Whenever the response packet is received, mobile station communication unit 11 sends the received response packet to measuring unit 12. Whenever receiving the response packet, Measuring unit 12 measures, based on the response packet, the quality of radio communication with a radio base station specified by the identification information in the response packet. Measuring unit 12 adds the quality of radio communication and the identification information to a quality table in quality memory unit 13 by arranging the quality of radio communication and the identification information to correspond to each other.

In addition, at a predetermined time after sending the search packet, processing unit 14 acquires the quality table from quality memory unit 13 as search result information and searches for the best quality of radio communication from the search result information. Processing unit 14 extracts identification information corresponding to the best quality of radio communication as search result information.

Processing unit 14 determines a radio base station specified by the extracted identification information as a selecting radio base station (hereinafter, radio base station 103). Processing unit 14 generates a connection switching request and sends the pair including the connection switching request and the search result information to base station communication unit 3 of determined radio base station 103 through mobile station communication unit 11 (step L).

When the pair including the connection switching request and the search result information is received, base station communication unit 3 sends the pair including the connection switching request and the search result information to control unit 4.

Control unit 4, upon receiving the set, determines whether or not the amount of its own bandwidth that it uses in state memory unit 1 is at least a predetermined reference value. In this embodiment, it shall be assumed that t the amount of its own bandwidth that it uses is above the reference value due to congestion in the bandwidth of radio base station 103.

If it is determined that the amount of its own bandwidth that it uses is above the reference value, control unit 4 selects a switching radio base station based on a state table in state memory unit 1. In this embodiment, control unit 4 determines radio base station 104 as the switching radio base station since a smaller amount of the bandwidth of radio base station 104 is used compared to radio base station 103 even if the quality of radio communication with radio base station 103 is better than that with radio base station 104.

Control unit 4 extracts identification information specifying radio base station 104 from the stable table in state memory 1 as connection candidate information. Control unit 4 generates a rejection code and sends the rejection code and the connection candidate information to mobile station communication unit 11 of mobile station 105 through base station communication unit 3 (step M).

When the rejection code and the connection candidate information are received, mobile station communication unit 11 sends the rejection code and the connection candidate information to processing unit 14. Processing unit 14, upon receiving the rejection code and the connection candidate information, generates a connection switching request. Processing unit 14 then sends the connection switching request to base station communication unit 3 of radio base station 104 specified by the connection candidate information (step N).

When the connection switching request is received, base station communication unit 3 sends the connection switching request to control unit 4. Control unit 4, upon receiving the connection switching request, generates connection switching complete information and sends the generated connection switching complete information to mobile station communication unit 11 of mobile station 105 through base station communication unit 3 (step O).

When the connection switching complete information is received, mobile station communication unit 11 switches from radio base station 103 to radio base station 104. Thereby, voice communication between mobile station 105 and radio base station 104 is resumed, and thus handover is completed.

Thereafter, mobile station 105 and radio base station 104 perform voice communication (step P).

Below, a description will be given of effects.

In this embodiment, quality memory unit 13 remembers a quality table in which different qualities levels of radio communication with respective radio base stations are arranged according to identification information. When switching connection destination radio base stations, processing unit 14 determines, based on the quality table in quality memory unit 13, a selecting radio base station that will select a switching radio base station to be a connection destination after switching. Processing unit 14 sends the quality table to the determined selecting radio base station. Mobile station communication unit 11 receives identification information specifying the switching radio base station, which is selected based on the quality table from processing unit 14, and then sends a connection request to the switching radio base station specified by the identification information.

In this case, the selecting radio base station selecting the switching radio base station to be the connection destination after switching is determined based on the quality table in which different quality levels of radio communication with respective radio base stations are arranged according to identification information.

This makes it possible to send the quality table (search result information) to a radio base station having good quality of radio communication so as to reduce disconnections in communication from sending the search result information to receiving identification information (connection candidate information) specifying switching radio base station. Thereby, this can reduce failures when switching radio base stations.

In this embodiment, processing unit 14 determines a radio base station specified by identification information corresponding to the best quality of radio communication in the quality table as the selecting radio base station. In this case, since the radio base station having the best quality of radio communication is determined as the selecting radio base station, failures in switching radio base stations can be further reduced.

Furthermore, in this embodiment, the processing unit sends the quality table and the connection request to the selecting radio base station. Mobile station communication unit 11 sends the connection request to the switching radio base station if identification information and a rejection code are received and connects to the selecting radio base station when connection switching complete information is received.

In this case, when the selecting radio base station has approved the connection, it is possible to prevent sending the connection request to the switching radio base station. This as a result can reduce the amount of time spent before handover is completed.

Next, a description will be given of a second embodiment.

While the first embodiment has been described with respect to mobile station 105 connected to radio base station 104, which is a candidate for a connection destination after switching, this embodiment is described with respect to a case where radio base station 104 rejects a connection switching request. In the meantime, radio base station 104 rejects a connection when radio base station 104 is broken, when the amount of using available bandwidths that is being used is sharply increasing due to rapid increase in communication traffics, etc.

In this embodiment, mobile station communication unit 11 sends a connection switching request and a quality table to a switching radio base station.

When identification information of a new switching radio base station selected by the quality table and rejection information notifying rejection of the connection switching request are received from the switching radio base station, mobile station communication unit 11 sends a connection request to the new switching radio base station. In the meantime, when connection switching complete information in response to the connection switching request sent to the switching radio base station is received from the switching radio base station, mobile station communication unit 11 connects to the switching radio base station.

Figure 6:
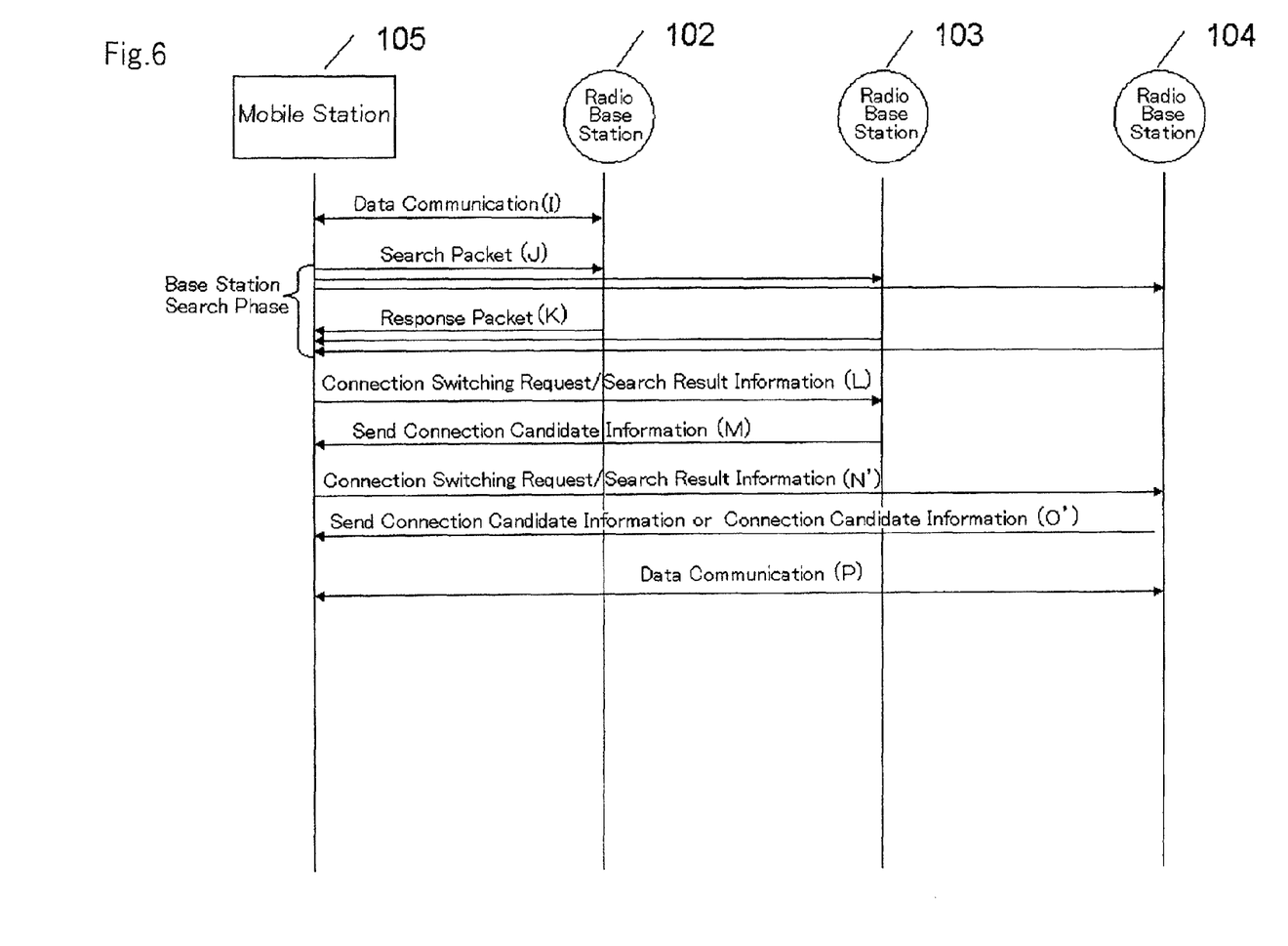
FIG. 6 is a sequence diagram illustrating another operation of a multimedia mobile communication system.

FIG. 6 is a sequence diagram illustrating another operation of a multimedia mobile communication system. In FIG. 6, the same reference numerals and signs are used to designate components that are the same as or similar to those of FIG. 5, and a description of the same or similar components will be omitted.

When control unit 4 sends a rejection code and connection candidate information in step M, the following process is carried out.

When the connection candidate information and the rejection code are received, mobile station communication unit 11 of mobile station 105 sends the connection candidate information and the rejection code to processing unit 14. Processing unit 14, upon receiving the connection candidate information and the rejection code, generates a connection switching request while acquiring a quality table as search result information from quality memory unit 13. Processing unit 14 sends a pair including the connection switching request and the search result information to base station communication unit 3 of radio base station 104 specified by identification information (i.e., the connection candidate information) through mobile station communication unit 11 (step N').

Thereby, mobile station communication unit 11 sends the connection request and the quality table in the quality memory unit 13 to a switching radio base station.

When a pair including the connection request and the search result information is received, base station communication unit 3 sends the set of the connection request and the search result information to control unit 4. Control unit 4, upon receiving the pair, determines whether or not to reject the connection switching request.

In the case of approving the connection switching request, control unit 4 generates connection switching complete information in response to the connection switching request. Control unit 4 sends the connection switching complete information to mobile station communication unit 11 of mobile station 105 through base station communication unit 3 (step O'). Then, next step P is carried out.

In the case of rejecting the connection switching request, control unit 4 selects a new switching radio base station based on the search result and a state table in state memory unit 1. Control unit 4 extracts identification information specifying the new switching radio base station as connection candidate information from the state table in state memory unit 1. Control unit 4 generates a rejection code and sends the rejection code and the connection candidate information to mobile station communication unit 11 of mobile station 105 through base station communication unit 3 (step O'). Then, step N' is performed again.

Below, a description will be given of effects.

In this embodiment, mobile station communication unit 11 sends a connection switching request and a quality table to a switching radio base station. When identification information of a new switching radio base station and a rejection information notifying rejection of a connection request are received from the switching radio base station, mobile station communication unit 11 sends a connection request to the new switching radio base station. In the meantime, when connection switching complete information in response to the connection request sent to the switching radio base station is received from the switching radio base station, mobile station communication unit 11 connects to the switching radio base station.

In this case, when the switching radio base station rejects a connection switching request, even if a search request is not sent, a connection request can be sent to the new switching radio base station. This as a result makes it possible to reduce the amount of searching time on the new switching radio base station so as to reduce the amount of time before handover is completed.

While preferred embodiments of the present invention have been described using specific terms, such description is for illustrative purposes only, and it is to be understood that changes and variations may be made without departing from the spirit or scope of the following claims.

What is claimed is:

1. A mobile station which is capable of connecting to a plurality of radio base stations and which is currently communicating with a currently-communicating radio base station from among the plurality of radio base stations, the mobile station comprising:
   a quality memory unit that remembers a quality table in which different quality levels of communication with the radio base stations are arranged according to identification information of the radio base stations;
   a processing unit that determines, based on the quality table in said quality memory unit, a selecting radio base station to select a switching radio base station to be a connection destination after switching and sending the quality table to the selecting radio base station when switching connection destination radio base stations; and
   a connecting unit that sends a connection request to the switching radio base station specified by the identification information, if identification information of the switching radio base station selected by the selecting radio base station according to the quality table sent from said processing unit is received,
   wherein the currently-communicating radio base station is different from the selecting radio base station.

2. The mobile station according to claim 1, wherein said processing unit determines a radio base station specified by the identification information corresponding to best quality level of radio communication from among the different quality levels in quality table as said selecting radio base station.

3. The mobile station according to claim 1, wherein
   said processing unit sends the quality table and the connection request to the selecting radio base station, and
   said connecting unit, if the identification information and rejection information notifying rejection of the connection request sent from said processing unit are received, sends the connection request to said switching radio base station, and if approval information notifying approval of the connection request sent from said processing unit is received, connects to said selecting radio base station.

4. The mobile station according to claim 1, wherein said connection unit sends the connection request and the quality table to said switching radio base station, if identification information of a new switching radio base station selected by the switching radio base station according to the quality table and rejection information notifying rejection of the connection request are received, sends the connection request to said new switching radio base station, and if approval information notifying approval of the connection request sent to said switching radio base station is received, connects to said switching radio base station.

5. A method of switching connection destinations by a mobile station, which is capable of connecting to a plurality of radio base stations and which includes quality memory unit remembering a quality table in which different quality levels of communication with the radio base stations are arranged according to identification information of the radio base stations, wherein the mobile station is currently communicating with a currently-communicating radio base station from among the plurality of radio base stations, the method comprising:
    determining, based on the quality table in the quality memory unit, a selecting radio base station to select a switching radio base station to be a connection destination after switching and sending the quality table to the selecting radio base station when switching connection destination radio base stations; and
    if identification information of the switching radio base station selected by the selecting radio base station according to the quality table sent from the processing unit is received, sending a connection request to the switching radio base station specified by the identification information,
    wherein the currently-communicating radio base station is different from the selecting radio base station.

6. The method according to claim 5, wherein determining a radio base station specified by identification information corresponding to the best quality level of radio communication as the selecting radio base station.

7. The method according to claim 5, comprising:
    determining a selecting radio base station sending the quality table and the connection request to the selecting radio base station, and
    if the identification information and rejection information notifying rejection of the connection request sent from the processing unit is received, sending the connection request to the switching radio base station, and if approval information notifying approval of the connection request sent from the processing unit is received, connecting to the selecting radio base station.

8. The method according to claim 5, comprising:
    sending the connection request and the quality table to the switching radio base station, and
    if identification information of a new switching radio base station selected by the switching radio base station according to the quality table and rejection information notifying rejection of the connection request are received, sending the connection request to the new switching radio base station, and if approval information notifying approval of the connection request sent to the switching radio base station is received, connecting to the switching radio base station.

* * * * *